US011925595B2

(12) United States Patent
Bellin

(10) Patent No.: US 11,925,595 B2
(45) Date of Patent: Mar. 12, 2024

(54) STAIR STEP ASSISTING DEVICE AND METHOD

(71) Applicant: Gerald H. Bellin, Lakeland, FL (US)

(72) Inventor: Gerald H. Bellin, Lakeland, FL (US)

( * ) Notice: Subject to any disclaimer, the term of this patent is extended or adjusted under 35 U.S.C. 154(b) by 365 days.

(21) Appl. No.: 17/321,948

(22) Filed: May 17, 2021

(65) Prior Publication Data

US 2021/0369538 A1 Dec. 2, 2021

Related U.S. Application Data

(60) Provisional application No. 63/029,862, filed on May 26, 2020.

(51) Int. Cl.
*A61H 3/00* (2006.01)

(52) U.S. Cl.
CPC ......... *A61H 3/00* (2013.01); *A61H 2003/001* (2013.01); *A61H 2003/005* (2013.01)

(58) Field of Classification Search
CPC ................................................ A61H 2003/001
See application file for complete search history.

(56) References Cited

U.S. PATENT DOCUMENTS

| | | | | | |
|---|---|---|---|---|---|
| 4,113,161 | A * | 9/1978 | Manuszak | A45C 13/26 108/14 |
| 4,844,199 | A * | 7/1989 | Nimz | A61H 3/00 182/132 |
| 5,131,494 | A * | 7/1992 | Heifetz | A61H 3/00 182/113 |
| 5,355,904 | A | 10/1994 | Wallum | |
| 5,957,146 | A * | 9/1999 | Corey | A61H 3/00 52/645 |
| 8,302,974 | B2 | 11/2012 | Kline | |
| 9,107,503 | B2 | 8/2015 | Kline | |
| 9,895,281 | B1 * | 2/2018 | Sigsworth | A61H 3/00 |
| 2014/0137912 | A1 | 5/2014 | Kline | |
| 2014/0261587 | A1 * | 9/2014 | Price | A61H 3/00 135/65 |
| 2016/0346157 | A1 * | 12/2016 | Barto | E04F 11/02 |

* cited by examiner

*Primary Examiner* — Noah Chandler Hawk
(74) *Attorney, Agent, or Firm* — John Veldhuis-Kroeze; Westman, Champlin & Koehler, P.A.

(57) ABSTRACT

Disclosed embodiments include a stair step assisting device which aids a user, recovering from surgery or having an injury which prevents bearing weight on one foot or ankle, in climbing or descending a staircase. The stair step assisting device has a main body, a lower body and an upper body, which in some embodiments are adjustable relative to one another to accommodate heights of different users and/or different riser heights of different staircases. The device includes lower and upper tread interface surfaces which rest on treads of two adjacent steps, and lower and upper riser interface surfaces which are positioned against risers of two adjacent steps.

11 Claims, 7 Drawing Sheets

STAIR STEP ASSISTING DEVICE AND METHOD

CROSS-REFERENCE TO RELATED APPLICATION

This application claims priority to U.S. provisional application No. 63/029,862, filed on May 26, 2020, the content of which is hereby incorporated by reference in its entirety.

BACKGROUND

This disclosure is directed toward devices for aiding users with injures which do not allow weight bearing activity on one of his or her feet. More particularly, this disclosure is directed toward a device which aids a user in navigating stairs without bearing weight on one of his or her feet.

Annually, there are thousands of people that, due to injury or surgery, find themselves in a condition with a non-weight bearing restriction on one of their feet. For example, such restrictions may be required after an ankle replacement or other surgery, when healing from a broken lower leg bone, or in other circumstances. This non-weight bearing restriction produces a major obstacle in navigating stairs. Those patients with limited upper body strength will have a great deal of difficulty using crutches to go up or down stairs. Stability is also an issue, as the patient needs to “hop” up or down the stairs when using crutches. If the non-weight bearing situation is permanent, a ramp can be the ultimate solution. However, ramps can be expensive for more temporary non-weight bearing situations. Also, ramps require structural changes to the stairs. For shorter healing periods, for example six months or less, other solutions would be beneficial. The solutions ideally provide enhanced stability, as crutches, canes or devices with legs are often not sufficiently stable.

The discussion above is merely provided for general background information and is not intended to be used as an aid in determining the scope of the claimed subject matter.

SUMMARY

Disclosed embodiments include a stair step assisting device which aids a user, recovering from surgery or having an injury which prevents bearing weight on one foot or ankle, in climbing or descending a staircase. The stair step assisting device has a main body, a lower body and an upper body, which in some embodiments are adjustable relative to one another to accommodate heights of different users and/or different riser heights of different staircases. The device includes lower and upper tread interface surfaces which rest on treads of two adjacent steps, and lower and upper riser interface surfaces which are positioned against risers of two adjacent steps. In some exemplary embodiments, the lower and upper tread interface surfaces span substantially the entire depths of the step treads, while the lower and upper riser interface surfaces span substantially the entire heights of the step risers, providing optimized stability.

In an exemplary embodiment, a stair step assisting device 100 is provided which aids a user in climbing or descending stairs without bearing weight on one foot or ankle. The exemplary device includes a lower body portion 104 providing a lower tread interface surface 126 configured to rest on a tread (e.g., 212) of a first step (e.g., 210). The device 100 also includes a main body portion 102 above the lower body portion and providing an upper tread interface surface 128 configured to rest on a tread (e.g., 218) of a second step (e.g., 216) positioned above the first step. The device 100 also includes an upper body portion 106 above the main body portion and providing a top surface 109 configured to support a knee or lower leg of a first leg of the user while a second leg of the user is at least partially extended and supported by the first step (e.g., 210). The device 100 also includes at least one handle 110, 112 configured to aid the user in repositioning the stair step assisting device to a next step.

In an exemplary embodiment, the stair step assisting device 100 further includes a first riser interface surface 130, 132 configured to be positioned against a first riser (e.g., 204, 206, 214) while the lower tread interface surface rests on the tread of the first step and the upper tread interface surface rests on the tread of the second step.

In an exemplary embodiment, the first riser is positioned between the tread of the first step and the tread of the second step, and the device 100 further includes a second riser interface surface configured to be positioned against a second riser while the lower tread interface surface rests on the tread of the first step and the upper tread interface surface rests on the tread of the second step, the second riser being positioned between the tread of the second step and a tread of a third step, wherein the second riser interface surface includes a substantially planar portion. The first and second riser interface surfaces can be substantially planar or include substantially planar portions.

In an exemplary embodiment, the upper body portion and the main body portion are adjustably coupled such that the upper body portion is configured to be adjusted vertically relative to the main body portion to position the top surface at different heights, relative to the lower tread interface surface, for different users. The upper body portion and the main body portion can include first locking features (e.g., 114, 116 and 118) configured to allow vertical adjustment of the upper body portion relative to the main body portion into a plurality of positions and to lock the upper body portion in a desired position relative to the main body portion.

In an exemplary embodiment, the lower body portion and the main body portion are adjustably coupled such that the lower body portion is configured to be adjusted vertically relative to the main body portion to increase or decrease a distance between the lower tread interface surface and the upper tread interface surface to accommodate different riser heights of the stairs. The lower body portion and the main body portion can include locking features (e.g., 120, 122, 124) configured to allow vertical adjustment of the lower body portion relative to the main body portion into a plurality of positions and to lock the lower body portion in a desired position relative to the main body portion.

In an exemplary embodiment, device 100 includes a pad 108 on the top surface such that the top surface supports the knee or lower leg of the first leg of the user through the pad.

In an exemplary embodiment, the at least one handle comprises a top handle 110 or side handles 112 positioned to be pulled upward by one or both hands of the user while the knee or lower leg of the first leg of the user is supported by the top surface and while the second leg of the user is supported by the first step.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

Figure 1:
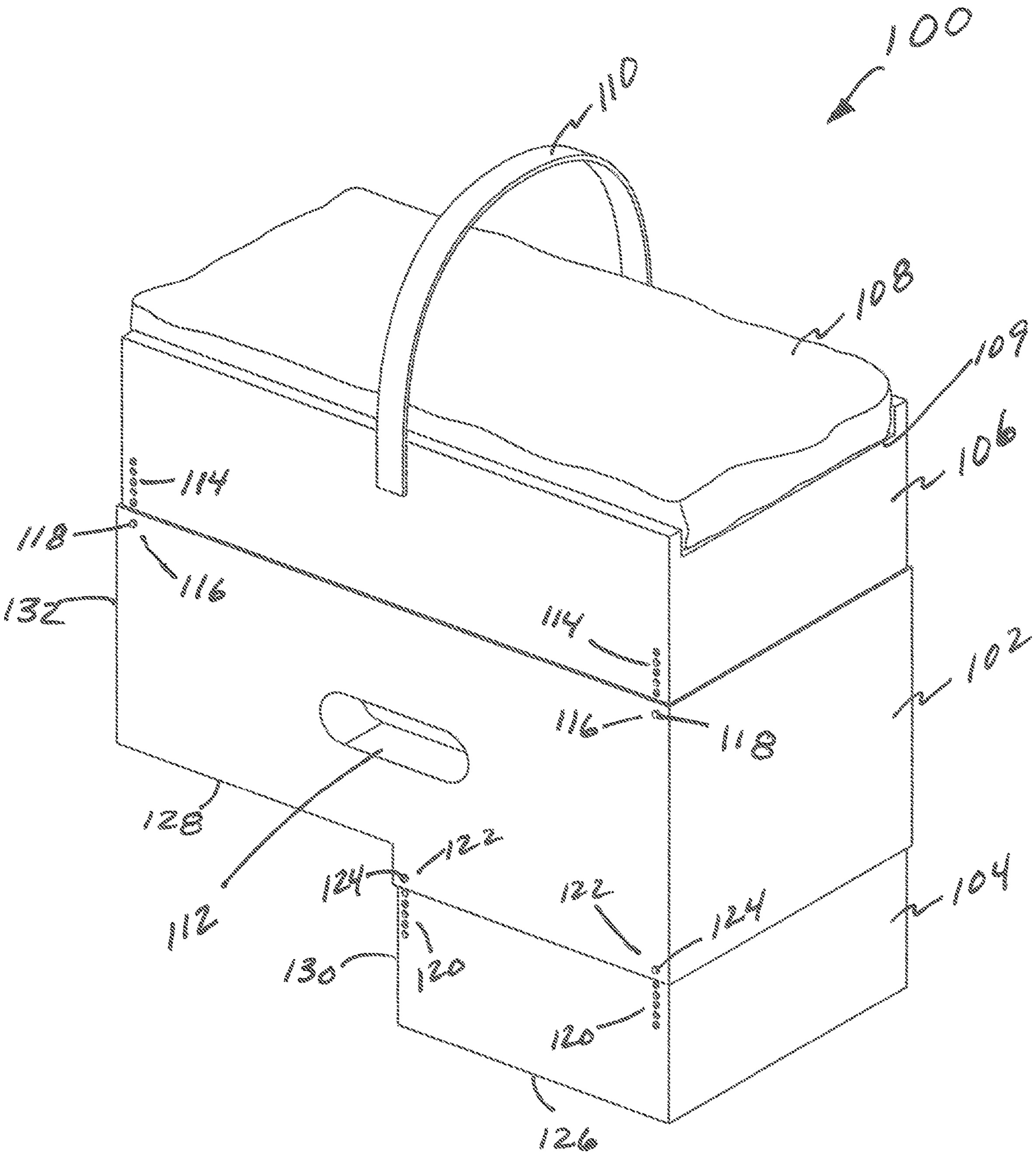
FIG. 1 is a perspective view of a stair step assisting device in accordance with an exemplary embodiment.
Figure 2:
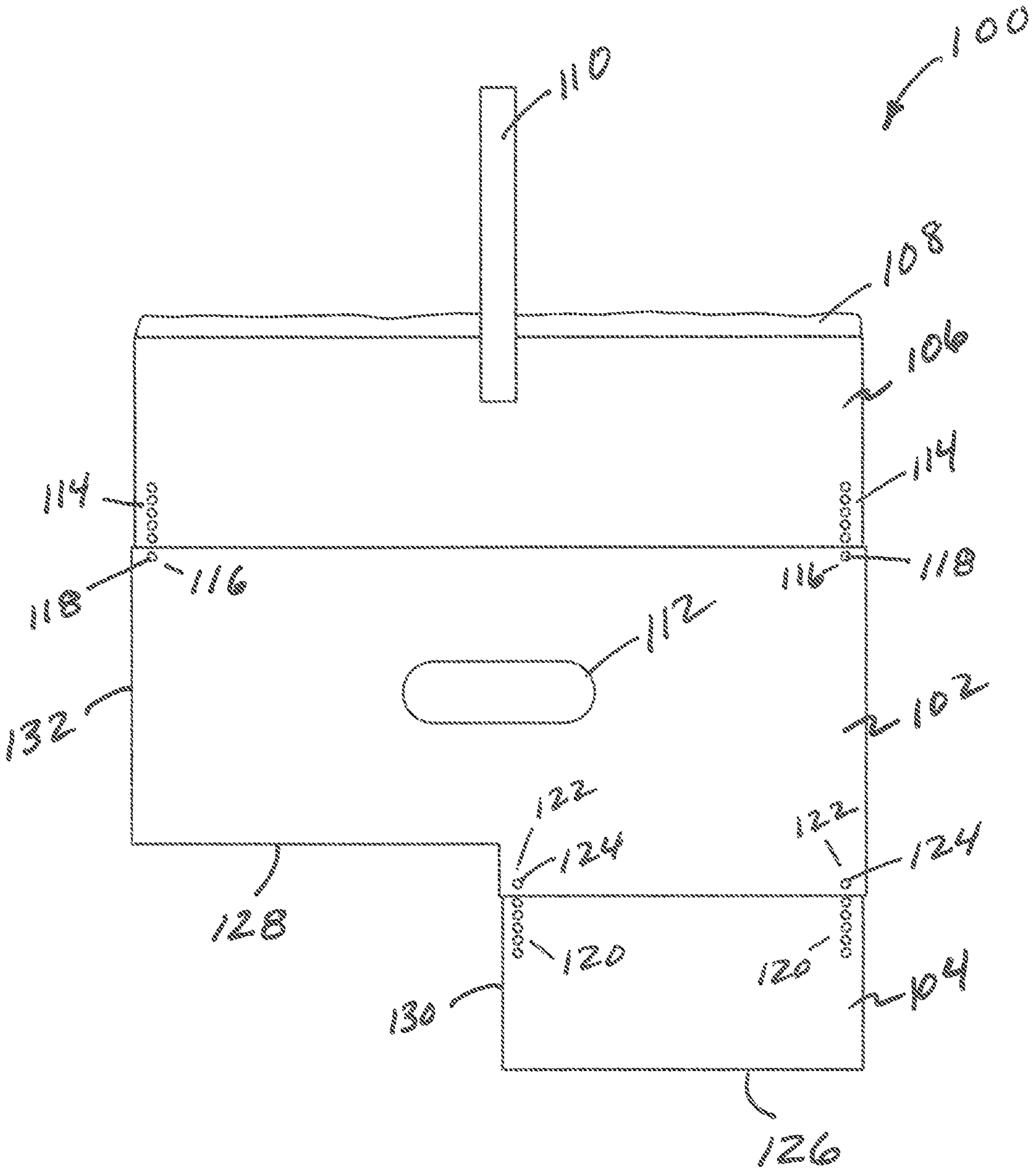
FIG. 2 is a left-hand side view of the stair step assisting device shown in FIG. 1.
Figure 3:
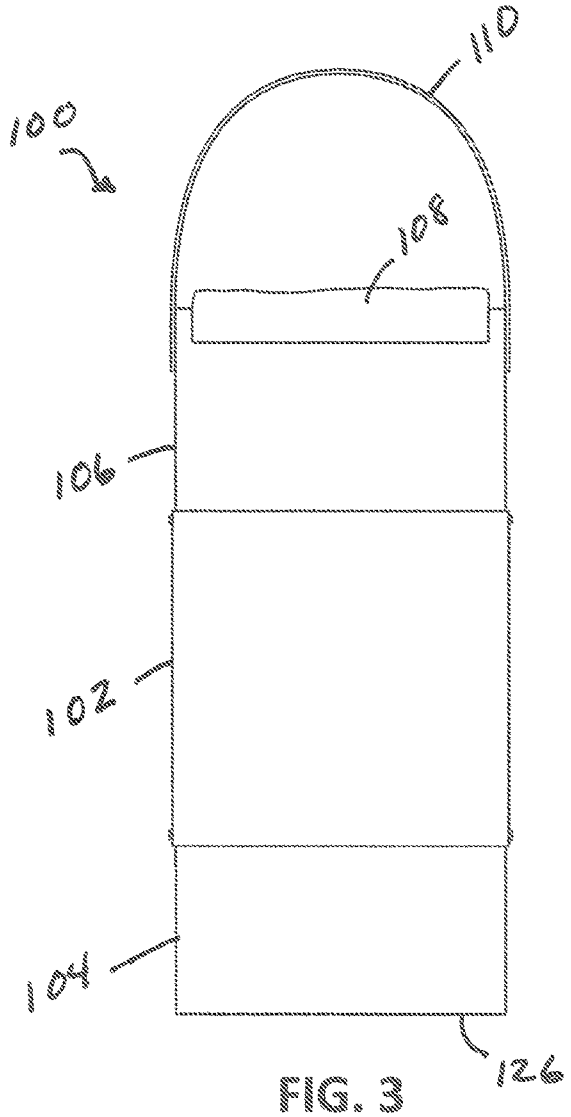
FIG. 3 is a rear view of the stair step assisting device shown in FIG. 1.
Figure 4:
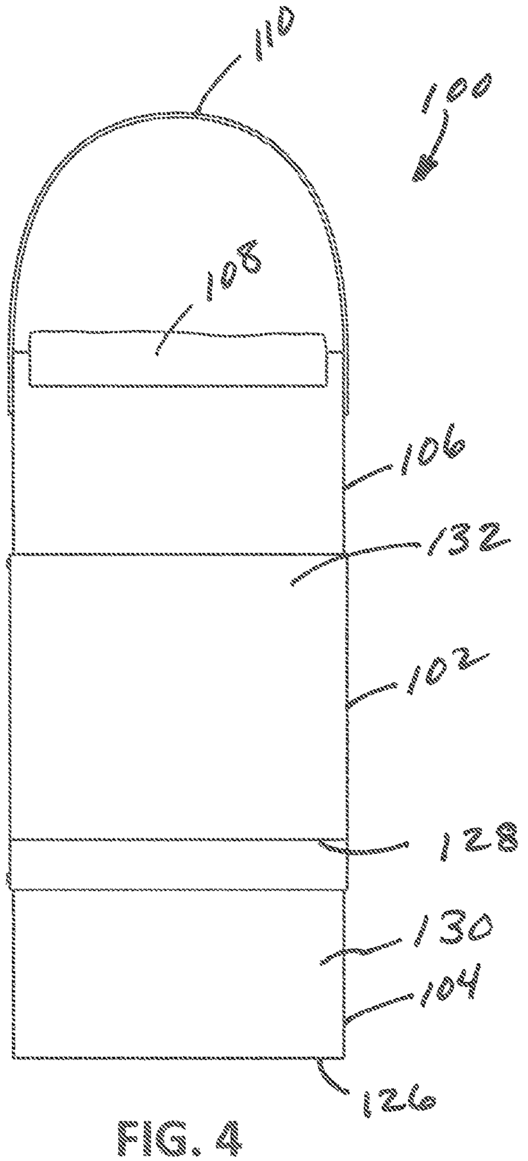
FIG. 4 is a front view of the stair step assisting device shown in FIG. 1.
Figure 5:
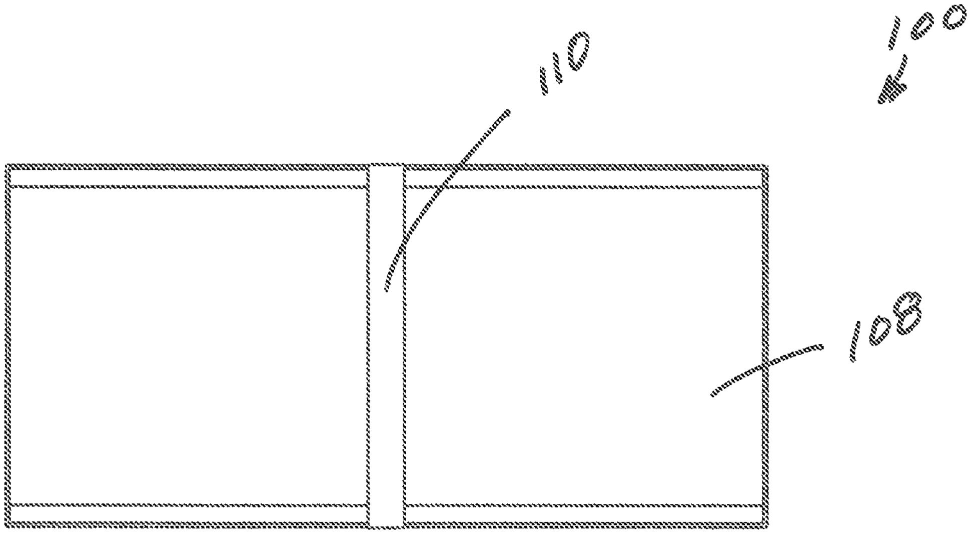
FIG. 5 is a top view of the stair step assisting device shown in FIG. 1.
Figure 6:
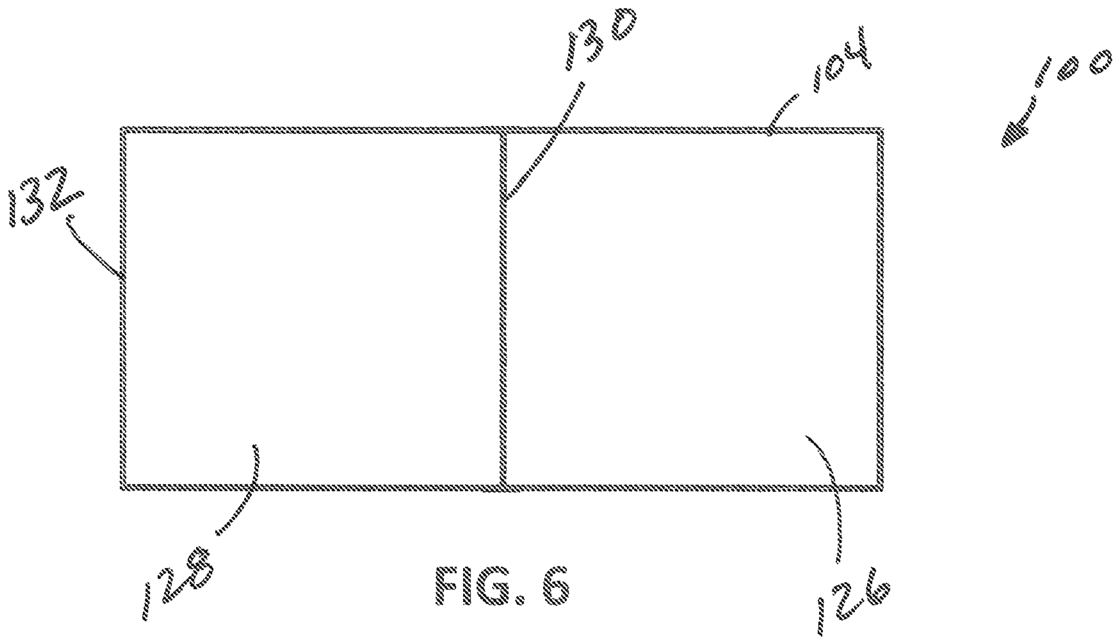
FIG. 6 is a bottom view of the stair step assisting device shown in FIG. 1.

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include a stair step assisting device which aids a user, such as a patient recovering from surgery, allowing the user to exert less energy while safely navigating stairs. The device can be used by the user, individually, or with the help of an assistant. As will be discussed with reference to FIGS. 7-9, to climb a set of stairs the device is placed on the bottom step and on the floor, the user kneels on the device, and steps up onto the next adjacent step tread with their "good" or weight non-restricted foot. Then the device is moved up to the next step; the user again kneels on the device and steps up. This process continues until the patient is on the top stair landing. Going down stairs the device is used in the opposite manner. The patient or user, or their assistant, places the device on the top step, kneels on the device, and steps backwards down to the adjacent lower step tread, continuing in a similar manner until the user is at the bottom of the stairs.

Because people are of different heights, in some exemplary embodiments, the height of the stair step assisting device is adjustable to the individual's particular distance from knee to floor, making it more comfortable, and more beneficial for individual use. Further, while the standard riser of a typical step is 7½ inches, for stairs with risers which are shorter or taller, some embodiments of the stair step assisting device allow for adjustable rise heights such that device remains stable and safe for the user. Because the disclosed devices are designed to rest on most or all of the treads of two adjacent steps, and because the device can include riser interfacing surfaces for positioning against risers of two adjacent steps, stability for the user is optimized.

Referring now to FIGS. 1-6, shown is an exemplary embodiment of stair step assisting device 100. Device 100 includes, in this exemplary embodiment, a main body portion 102, a lower body portion 104, and an upper body portion 106. Main body 102, lower body 104 and upper body 106 can be made of any suitable material. For instance, these portions of device 100 can be made of a plastic material using an injection molding process. This allows device 100 to be light weight and easily moved. In the alternative, main body portion 102, lower body portion 104 and upper body portion 106 can be made of metal material, wood material, or any other suitable material using any suitable process. In exemplary embodiments, device 100 includes a pad or cushion 108 attached to, removably or permanently, a top surface 109 of upper body 106 to allow the user to comfortably rest their body weight on device 100 through their knee and lower leg. This prevents weight bearing on an injured ankle or foot.

Device 100 can also include a top handle 110 and/or one or more side handles 112 to aid the user (or an assistant) in moving the device between adjacent steps. Handle 110 can be connected to opposing side surfaces of upper body 106, while side handles 112 can be attached to or integrally formed in the sides of main body 102. Handles 110 and 112 can also be attached to, or formed integrally with, other portions of device 100 in other embodiments.

To provide an adjustable height of the distance between a stair tread and top surface 109 of upper body 106 or pad 108, upper body 106 can include a column of apertures 114 in some or all corners of the device. In other embodiments, the apertures can be located away from the corners if desired, and can be on front, back or side surfaces of upper body 106. A corresponding aperture 116 in main body 102 is positioned adjacent each column of apertures 114. The upper body 106 can be moved up and down relative to the main body 102 to achieve a desired height of the device, and with each aperture 116 aligned with one aperture of a corresponding column of apertures 114, a peg or pin 118 can be placed through the apertures to lock the device at the particular height. While in the illustrated embodiment columns of apertures 114 are positioned in upper body 106 and a single adjacent aperture 116 is positioned in main body 102, this can be reversed in alternate embodiments. Further, instead of a single aperture 116 adjacent to each column of apertures 114, the main body can also include a column of apertures in some embodiments. This would allow additional pins 118 to be used to further secure the upper body to the main body at a particular height.

To allow for adjustability for different riser heights for different sets of stairs, lower body 104 is similarly adjustable relative to main body 102. As illustrated, lower body 104 can include a column of apertures 120 in some or all corners of the lower body. In other embodiments, the apertures can be located away from the corners if desired, and can be on front, back or side surfaces of lower body 104. A corresponding aperture 122 in main body 102 is positioned adjacent each column of apertures 120. The lower body 104 can be moved up and down relative to the main body 102 to achieve a desired riser height of the device, and with each aperture 122 aligned with one aperture of a corresponding column of apertures 120, a peg or pin 124 can be placed through the apertures to lock the device at the particular riser height configuration. While in the illustrated embodiment columns of apertures 120 are positioned in lower body 104 and a single adjacent aperture 122 is positioned in main body 102, this can be reversed in alternate embodiments. Further, as was the case with apertures 116, instead of a single aperture 122 adjacent to each column of apertures 120, the main body can also include a column of apertures in some embodiments. This would allow additional pins 124 to be used to further secure the lower body to the main body at a particular riser height configuration. Selecting the correct riser height optimizes stability by ensuring that the device 100 sits firmly on treads of two adjacent steps, while resting vertically against risers of two adjacent steps.

As discussed, device 100 is configured to sit on the tread portions of two adjacent steps (or on the floor and the tread portion of the first step). To accomplish this stability feature, lower body 104 includes a lower tread interface surface 126, while main body 102 includes an upper tread interface surface 128. With surfaces 126 and 128 resting on adjacent step treads, increased stability is achieved as compared to devices having legs. To further optimize this stability, the depths or spans of surfaces 126 and 128 can be such that the surfaces extend substantially across the entire tread depths of the adjacent steps.

To also optimize stability, device 100 includes lower riser interface surface 130 and upper riser interface surface 132. The lower riser interface surface is formed from portions of main body 102 and lower body 104, while the upper riser interface surface is formed from portions of main body 102 and upper body 106. Lower riser interface surface 130 is positionable against the riser between the treads on which surfaces 126 and 128 rest, while the upper riser interface 132 is positionable against the next highest riser. In exemplary embodiments, riser interface surfaces 130 and 132 are substantially planar, or include substantially planar portions, to optimize stability of device 100 when positioned against corresponding risers of the stairs.

Figure 7:
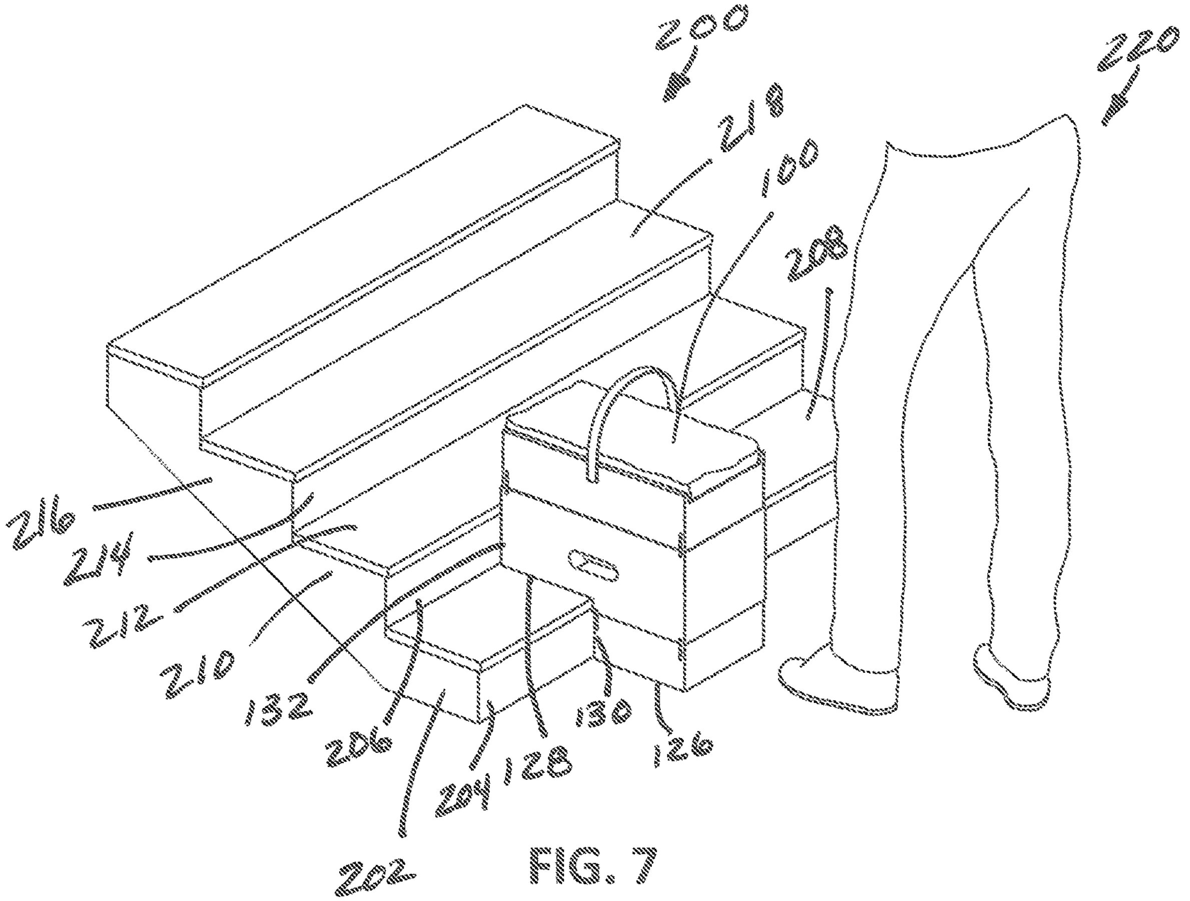
FIG. 7 is a perspective view showing the stair step assisting device positioned to rest on the floor and on the tread of a first step in preparation for use by a user in climbing a staircase.
Figure 8:
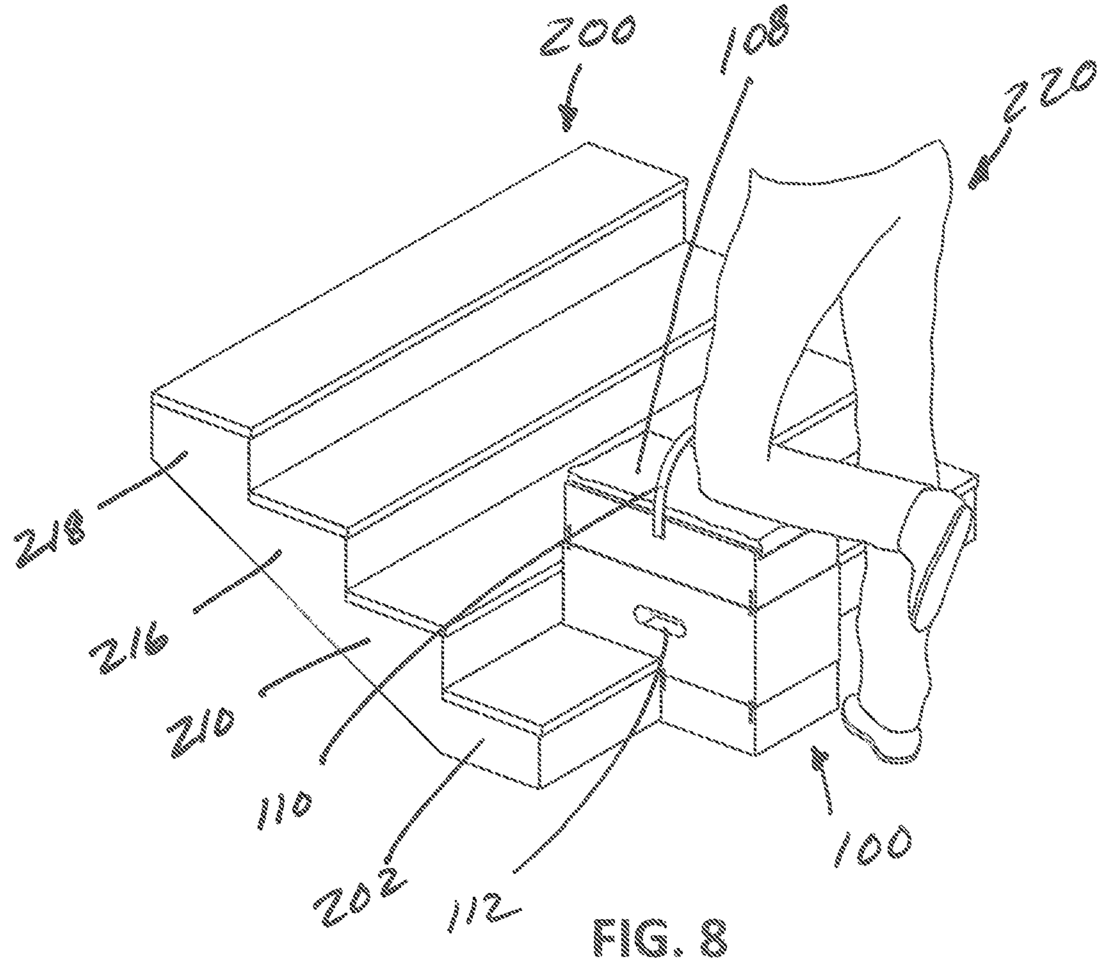
FIG. 8 is a perspective view of the stair step assisting device in the position shown in FIG. 7, with one of the user's knees and lower leg resting on the device.
Figure 9:
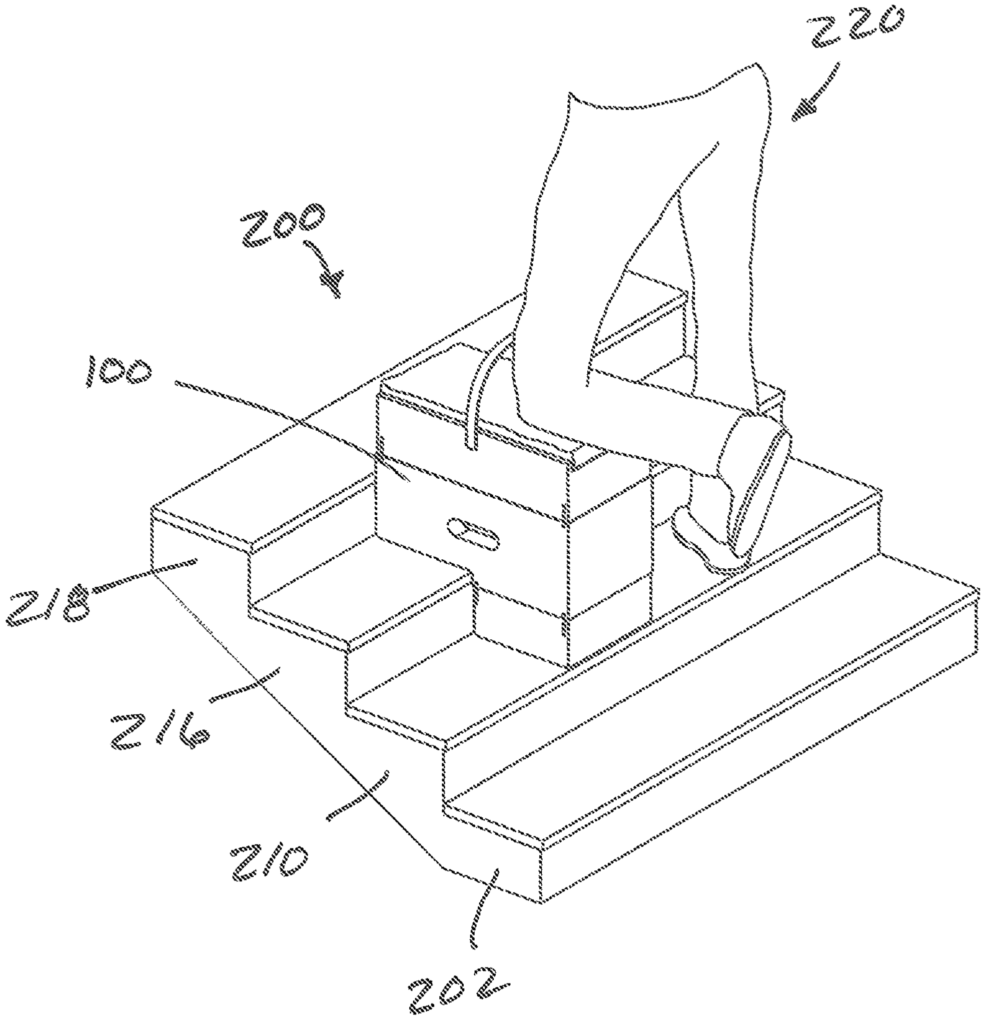
FIG. 9 is a perspective view of the stair step assisting device positioned to rest on the treads of two adjacent steps during use in climbing the staircase.

Referring now to FIG. 7, shown is stair step assisting device 100 positioned for a user to start climbing a staircase 200. The device 100 is positioned and resting on the floor and on a first step 202. As can be seen, in this initial position, lower tread interface surface 126 is positioned on the floor, while upper tread interface surface 128 is positioned on tread 208 of first step 202. In this position, lower riser interface surface 130 is positioned against riser 204 extending between the floor and tread 208 of the first step 202. Upper riser interface surface 132 is positioned against riser 206 extending between tread 208 of first step 202 and tread 212 of second step 210. As shown in FIG. 8, a user 220 positions a knee and lower leg on pad or cushion 108 of device 100. In this illustration, the user's left knee and leg are positioned on device 100. The user would then step up onto tread 208 of the first step 202 using his or her other leg—the right leg in this illustration. The user, or an assistant, would then use handles 110 or 112 to reposition the device 100 on the next higher step. For instance, in this illustration, lower tread interface surface 126 is repositioned on the tread 208, while upper tread interface surface 128 is repositioned on tread 212 of second step 210. In the new position, lower riser interface surface 130 is positioned against riser 206, while upper riser interface surface 132 is positioned against riser 214 extending between tread 212 of second step 210 and tread 218 of third step 216. The process repeats until the user has reached the top of the staircase 200. FIG. 9 illustrates the user in a position toward the top of the staircase.

Although the present invention has been described with reference to preferred embodiments, workers skilled in the art will recognize that changes may be made in form and detail without departing from the scope of the discussion.

What is claimed is:

1. A stair step assisting device which aids a user in climbing or descending stairs without bearing weight on one foot or ankle, the stair step assisting device comprising:

a lower body portion providing a lower tread interface surface configured to rest on a tread of a first step;

a main body portion above the lower body portion and providing an upper tread interface surface configured to rest on a tread of a second step, the second step above the first step;

an upper body portion above the main body portion and providing a top surface at a first height relative to the lower tread interface surface and extending at the first height over both of the tread of the first step and the tread of the second step, the top surface configured to support a knee or lower leg of a first leg of the user while a second leg of the user is at least partially extended and supported by the first step;

at least one handle configured to aid the user in repositioning the stair step assisting device to a next step;

wherein the upper body portion and the main body portion are adjustably coupled such that the upper body portion is configured to be adjusted vertically relative to the main body portion to position the top surface at different heights, relative to the lower tread interface surface, for different users, wherein one of the upper body portion and the main body portion is configured to be received inside of the other of the upper body portion and the main body portion to provide the adjustable coupling between the upper body portion and the main body portion; and wherein the lower body portion and the main body portion are adjustably coupled such that the lower body portion is configured to be adjusted vertically relative to the main body portion to increase or decrease a distance between the lower tread interface surface and the upper tread interface surface to accommodate different riser heights of the stairs, wherein one of the lower body portion and the main body portion is configured to be received inside of the other of the lower body portion and the main body portion to provide the adjustable coupling between the lower body portion and the main body portion.

2. The stair step assisting device of claim 1, and further comprising a first riser interface surface configured to be positioned against a first riser while the lower tread interface surface rests on the tread of the first step and the upper tread interface surface rests on the tread of the second step.

3. The stair step assisting device of claim 2, wherein the first riser interface surface includes a substantially planar portion.

4. The stair step assisting device of claim 2, wherein the first riser is positioned between the tread of the first step and the tread of the second step.

5. The stair step assisting device of claim 4, and further comprising a second riser interface surface configured to be positioned against a second riser while the lower tread interface surface rests on the tread of the first step and the upper tread interface surface rests on the tread of the second step, the second riser being positioned between the tread of the second step and a tread of a third step, wherein the second riser interface surface includes a substantially planar portion.

6. The stair step assisting device of claim 2, wherein the upper body portion and the main body portion include first locking features configured to allow vertical adjustment of the upper body portion relative to the main body portion into a plurality of positions and to lock the upper body portion in a desired position relative to the main body portion.

7. The stair step assisting device of claim 2, wherein the lower body portion and the main body portion include locking features configured to allow vertical adjustment of the lower body portion relative to the main body portion into a plurality of positions and to lock the lower body portion in a desired position relative to the main body portion.

8. The stair step assisting device of claim 1, and further comprising a pad on the top surface such that the top surface supports the knee or lower leg of the first leg of the user through the pad.

9. The stair step assisting device of claim 1, wherein the at least one handle comprises a top handle positioned to be pulled upward by a hand of the user while the knee or lower leg of the first leg of the user is supported by the top surface and while the second leg of the user is supported by the first step.

10. The stair step assisting device of claim 1, wherein the at least one handle comprises side handles positioned to be pulled upward by hands of the user while the knee or lower leg of the first leg of the user is supported by the top surface and while the second leg of the user is supported by the first step.

11. A stair step assisting device which aids a user in climbing or descending stairs without bearing weight on one foot or ankle, the stair step assisting device comprising:

a lower body portion providing a lower tread interface surface configured to rest on a tread of a first step;

a main body portion above the lower body portion and providing an upper tread interface surface configured to rest on a tread of a second step, the second step above the first step;

an upper body portion above the main body portion and providing a top surface configured to support a knee or lower leg of a first leg of the user while a second leg of the user is at least partially extended and supported by the first step;

at least one handle configured to aid the user in repositioning the stair step assisting device to a next step;

wherein the upper body portion and the main body portion are adjustably coupled such that the upper body portion is configured to be adjusted vertically relative to the main body portion to position the top surface at different heights, relative to the lower tread interface surface, for different users, wherein one of the upper body portion and the main body portion is configured to be received inside of the other of the upper body portion and the main body portion to provide the adjustable coupling between the upper body portion and the main body portion;

wherein the upper body portion and the main body portion include first locking features configured to allow vertical adjustment of the upper body portion relative to the main body portion into a plurality of positions and to lock the upper body portion in a desired position relative to the main body portion, wherein the first locking features include apertures in the upper body portion and the main body portion which are configured to be aligned and to receive a locking pin through aligned apertures and;

wherein the lower body portion and the main body portion are adjustably coupled such that the lower body portion is configured to be adjusted vertically relative to the main body portion to increase or decrease a distance between the lower tread interface surface and the upper tread interface surface to accommodate different riser heights of the stairs, wherein one of the lower body portion and the main body portion is configured to be received inside of the other of the lower body portion and the main body portion to provide the adjustable coupling between the lower body portion and the main body portion, and wherein the lower body portion and the main body portion include second locking features configured to allow vertical adjustment of the lower body portion relative to the main body portion into a plurality of positions and to lock the lower body portion in a desired position relative to the main body portion, wherein the second locking features include apertures in the lower body portion and the main body portion which are configured to be aligned and to receive a second locking pin through aligned apertures.

* * * * *